Patented Dec. 19, 1950

2,534,237

UNITED STATES PATENT OFFICE 2,534,237

8-HALOXANTHINE SALTS OF AMINOALKYL PHENOTHIAZINES AND THE PRODUCTION THEREOF

John W. Cusic, Skokie, Ill., assignor to G. D. Searle & Co., Chicago, Ill., a corporation of Illinois No Drawing. Application May 21, 1949, Serial No. 94,737

16 Claims. (Cl. 260—243)

This invention relates to haloxanthine compounds of aminoalkylphenothiazines and to the production thereof. More particularly this invention relates to 8-haloxanthine salts of basic phenothiazines having the following general structural formula

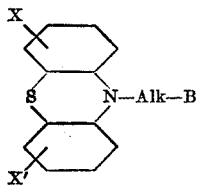

wherein B is an aliphatic-type organic amino radical, Alk is a lower alkylene radical, and X and X' are hydrogen, lower alkyl, lower alkoxyl or halogen radicals, and wherein the 8-haloxanthine contains a hydrogen atom in the 7-position.

This application is a continuation-in-part of my copending applications Serial No. 745,630, filed May 2, 1947, now abandoned, and Serial No. 71,763, filed January 19, 1949.

It is widely recognized that aminoalkylphenothiazines of the type to which this application relates elicit certain undesirable side reactions and toxic manifestations. Most common among these effects are dizziness and sleepiness. In certain cases there may be nausea and vomiting. Often the symptoms produced by such compounds are severe enough to warrant reduced dosage or discontinuance of the medication.

It is the object of this invention to produce therapeutic compositions of matter which are relatively free from untoward reactions. It is the further object to produce compositions of basic phenothiazines and haloxanthines having reduced toxicity. Another object is to produce compositions having enhanced therapeutic efficacy. Other objects will be apparent to those skilled in the art, in view of the following disclosure.

I have discovered that compounds of aminoalkylphenothiazines with haloxanthines produce little effect on the central nervous system and are therapeutically more useful than any of the individual components alone. I have further discovered that such compounds exert a potentiating effect and show enhanced activity. Such compounds are particularly useful in the treatment of anaphylaxis and allergic disorders and even in the suppression of undesirable side effects commonly elicited by the usual antihistaminic drugs. In certain instances the compounds of this invention can be used to prevent or alleviate nausea, dizziness, motion sickness, and other distressing reactions.

In the foregoing structural formula, B represents aliphatic-type amino radicals derived from primary and secondary aliphatic amines and from heterocyclic amines which are aliphatic in character. The aliphatic type amines from which the radical B is derived have dissociation constants in the range of $1 \times 10^{-3}$ to $1 \times 10^{-5}$. Among such amines are the mono-(lower alkyl)-amines, di-(lower alkyl)amines, hydroxyalkyl-amines, alkyl-hydroxy-alkylamines, and cyclic amines such as piperidine, pyrrolidine, morpholine, thiamorpholine, lupetidine, and related amines. Alk represents straight or branched-chain bivalent aliphatic hydrocarbon radicals such as lower alkylene radicals, including ethylene, propylene, butylene, and polymethylene radicals. Alk contains from 2 to 5 carbon atoms and preferably contains 2 carbon atoms between the oxygen and amino groups. X and X' may represent the same or different radical chosen from hydrogen, chlorine, bromine, iodine, fluorine, methoxyl, ethoxyl, propoxyl, isopropoxyl, methyl, ethyl, propyl, and isopropyl. As used herein the terms "lower alkyl" and "lower alkoxyl" refer to radicals containing 1 to 5 carbon atoms, inclusive.

Organic bases of the foregoing type are sufficiently strong bases to form definite salts, which are often crystalline, with 8-haloxanthines which have a hydrogen atom in position 7. Among such haloxanthines are the chloro, bromo, and iodo derivatives of xanthine and theophylline. More particularly this invention is concerned with acidic xanthines such as

| | |
|---|---|
| 8-chlorotheophylline | 1,3-diethyl-8-bromo-xanthine |
| 8-bromotheophylline | |
| 8-chloroxanthine | 1,3-diethyl-8-chloro-xanthine |
| 3-methyl-8-chloro-xanthine | |
| | 8-iodotheophylline |
| 8-bromoxanthine | 8-iodo-1,3-diethyl-xanthine |
| 3-methyl-8-bromo-xanthine | |

The compositions to which this invention relates are prepared by dissolving the aminoalkylphenothiazine in a suitable solvent and treating the resulting solution with a solution of a halogenated xanthine. Solvents which are satisfactory for this reaction include the lower alcohols and ketones and their mixtures with water, ether, and hydrocarbons. Equivalent quantities of the basic phenothiazine and the halogenated xanthines are suitable, but generally small excesses of the basic phenothiazine are desirable. In many instances the resulting salt crystallizes out of the solution on chilling or standing or may be precipitated by the addition of a solvent such as ether or benzene in which the salts is insoluble.

The compounds of this invention may also be produced by heating a solution of an ammonium salt of a haloxanthine in a lower alcohol or ketone with an equivalent of the aminoalkylphenothiazine. During the heating ammonia is evolved and the haloxanthine salt of the basic phenothiazine is formed. This salt may be isolated by the foregoing procedure.

My invention is further illustrated in detail by the following examples which are not to be construed as limiting it in spirit or in scope.

*Example 1*

28.4 grams of 10-β-dimethylaminopropylphenothiazine and 17 g. of 8-chlorotheophylline are dissolved in a hot mixture of 100 cubic centimeters of alcohol and 10 cc. of water. After both of the reagents have dissolved in the hot solution, the solution is filtered and evaporated to dryness. A viscous light colored residue of the 8-chlorotheophylline salt of 10-β-dimethylaminopropylphenothiazine is obtained. This salt is dried at about 60° C. and soon granulates to a nearly white powder. This material is crystallized from alcohol and melts at 152–153° C.

*Example 2*

15 g. of 10-β-pyrrolidinoethylphenothiazine and 10 g. of 8-chlorotheophylline are dissolved in a hot mixture of 100 cc. of methyl ethyl ketone and 10 cc. parts of water. After the reagents are in solution in the hot liquid the solution is filtered and chilled. A crystalline precipitate of the 8-chlorotheophylline salt of 10-β-pyrrolidinoethylphenothiazine separates. This salt is removed by filtration, washed with cold methyl ethyl ketone and with ether and dried. It melts at 166–167° C.

*Example 3*

A mixture of 37 g. of 10-γ-dipropylaminopropyl-3-methoxyphenothiazine and 30 g. of 8-iodotheophylline is agitated with a boiling mixture of 275 cc. of methyl ethyl ketone and 20 g. of water until dissolved. The boiling solution is filtered and evaporated. The residue of the 8-iodotheophylline salt of 10-γ-dipropylaminopropyl-3-methoxyphenothiazine is triturated with cold methyl ethyl ketone and dried at 60–65° C.

*Example 4*

12 g. of 10-(β-2,6-lupetidinoethyl)phenothiazine and 7 g. of 8-chloroxanthine are agitated with a boiling mixture of 100 cc. of methyl ethyl ketone and 10 cc. of water. When the materials are dissolved the hot solution is filtered and evaporated on a steam bath. The viscous residue of the 8-chloroxanthine salt of 10-(β-2,6-lupetidinoethyl)phenothiazine is dried at about 60° C. It forms a thick, light-colored oil.

*Example 5*

19 g. of 10-β-dimethylaminoethylphenothiazine is dissolved in the minimum of warm alcohol. 12 g. of 8-chlorotheophylline are added with sufficient hot water to effect solution. The resulting dilute alcoholic solution is chilled and crystals of the 8-chlorotheophylline salt of 10-β-dimethylaminoethylphenothiazine separate. These crystals are removed and recrystallized from dilute alcohol. This salt melts at 168–169° C.

*Example 6*

11 g. of 8-bromotheophylline and 30 g. of 10-β-dimethylaminoethylphenothiazine are dissolved in the minimum of hot alcohol. The resulting solution is cooled, diluted with ether, and chilled. On standing crystals of the 8-bromotheophylline salt of 10-β-dimethylaminoethylphenothiazine separate. This salt melts at 167–168° C.

*Example 7*

15 g. of 10-β-(β-hydroxyethylmethylamino)-ethylphenothiazine and 10 g. of 8-chlorotheophylline are dissolved in 100 cc. of hot methyl ethyl ketone containing 25 cc. of water. The hot solution is treated with decolorizing charcoal, filtered and cooled. Ether is added until an oily precipitate of the 8-chlorotheophylline salt of 10-β-(β-hydroxyethylmethylamino)ethylphenothiazine separates. This oil is removed and dried at 65° C. It forms crystals melting at 135–140° C.

I claim:

1. An 8-haloxanthine salt of a basic phenothiazine of the formula

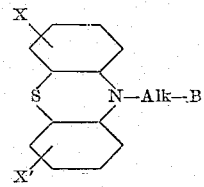

wherein X and X' are members of the group consisting of hydrogen, halogen, lower alkyl and lower alkoxyl radicals, Alk is a lower alkylene radical and B is an amino radical selected from the group consisting of di(lower alkyl)-amino, (lower hydroxyalkyl)(lower alkyl)amino, and saturated monocyclic heterocyclic amino radicals, wherein nitrogen is the sole hetero element, and wherein the 8-haloxanthine contains a hydrogen atom in position 7.

2. An 8-haloxanthine salt of a 10-di(lower alkyl)-amino-lower-alkylphenothiazine, wherein the 8-haloxanthine contains a hydrogen atom in position 7.

3. An 8-haloxanthine salt of a 10-dimethylamino-lower-alkylphenothiazine, where in the 8-haloxanthine contains a hydrogen atom in position 7.

4. An 8-halotheophylline salt of a 10-dimethylamino-lower-alkylphenothiazine.

5. An 8-halotheophylline salt of a 10-β-dimethylamino-lower-alkylphenothiazine.

6. An 8-halotheophylline salt of 10-β-dimethylaminopropylphenothiazine.

7. The 8-chlorotheophylline salt of 10-β-dimethylaminopropylphenothiazine.

8. An 8-helaxanthine salt of a basic phenothiazine of the formula

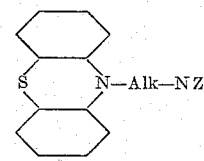

wherein Alk is a lower alkylene radical and Z represents the elements which with N form a saturated monocyclic heterocyclic radical wherein nitrogen is the sole hetero element, and wherein the 8-haloxanthine contains a hydrogen atom in position 7.

9. An 8-haloxanthine salt of a basic phenothiazine as in claim 8 wherein Z represents the carbon and hydrogen atoms required to form with N a five-membered, saturated heterocyclic amino radical, and wherein the 8-haloxanthine contains a hydrogen atom in position 7.

10. An 8-haloxanthine salt of a 10-pyrrolidino-lower-alkylphenothiazine, wherein the 8-haloxanthine contains a hydrogen atom in position 7.

11. An 8-halotheophylline salt of a 10-$\beta$-pyrrolidino-lower-alkylphenothiazine.

12. An 8-halotheophylline salt of 10-$\beta$-pyrrolidinoethylphenothiazine.

13. The 8-chlorotheophylline salt of 10-$\beta$-pyrrolidinoethylphenothiazine.

14. The process of producing a haloxanthine salt of an aliphatic-type-aminoalkylphenothiazine as defined in claim 1 which comprises dissolving equivalent quantities of an 8-haloxanthine which contains a hydrogen atom in position 7 and an aliphatic-type-aminoalkylphenothiazine in a hot water-soluble organic solvent and separating the salt thus formed.

15. The process of producing the 8-chlorotheophylline salt of 10-$\beta$-pyrrolidinoethylphenothiazine which comprises dissolving 8-chlorotheophylline and 10-$\beta$-pyrrolidinoethylphenothiazine in hot aqueous methyl ethyl ketone, chilling said solution and separating the crystalline salt thus formed.

16. The process of producing the 8-chlorotheophylline salt of 10-$\beta$-dimethylaminopropylphenothiazine which comprises dissolving 8-chlorotheophylline and 10-$\beta$-dimethylaminopropylphenothiazine in hot aqueous alcohol, chilling said solution and separating the crystalline salt thus formed.

JOHN W. CUSIC.

REFERENCES CITED

The following references are of record in the file of this patent:

UNITED STATES PATENTS

| Number | Name | Date |
|---|---|---|
| 2,054,903 | Hogedorn | Sept. 22, 1936 |

OTHER REFERENCES

Halpern, Comp. Rendu Ber. Biol. vol. 115 (1946) pp. 361–365.

Fienking, The Journal of Allergy, vol. 19 (1948), p. 91.

Certificate of Correction

Patent No. 2,534,237                                                                     December 19, 1950

JOHN W. CUSIC

It is hereby certified that error appears in the printed specification of the above numbered patent requiring correction as follows:

Column 4, line 64, for "8-helaxanthine" read *8-haloxanthine*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*